UNITED STATES PATENT OFFICE.

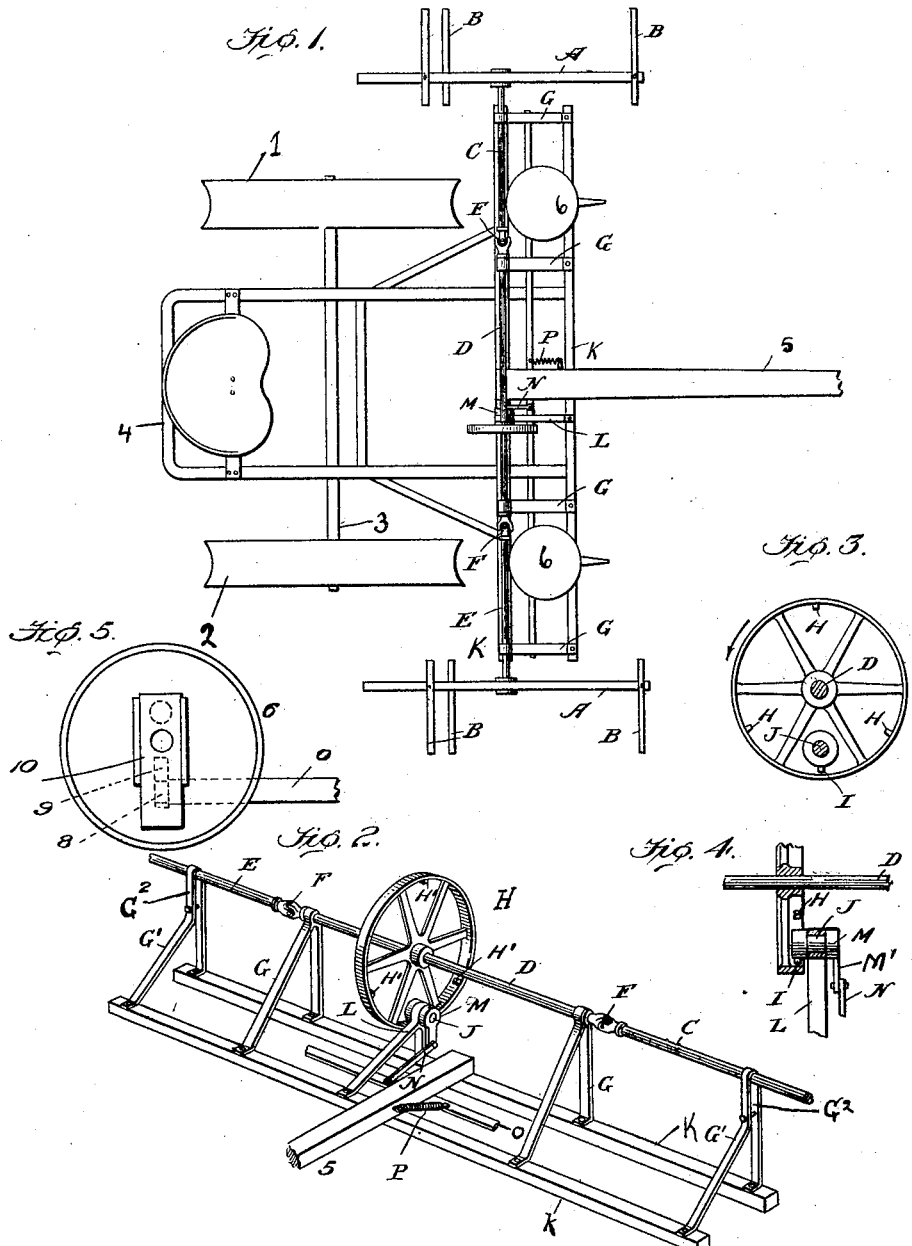

JOHN BRUSTER ERWAY, OF PISGAH, IOWA.

AUTOMATIC DROPPER FOR CORN-PLANTERS.

No. 925,469.          Specification of Letters Patent.         Patented June 22, 1909.

Application filed November 17, 1908. Serial No. 463,110.

*To all whom it may concern:*

Be it known that I, JOHN B. ERWAY, a citizen of the United States, residing at Pisgah, in the county of Harrison and State of Iowa, have invented a new and useful Automatic Dropper for Corn-Planters, of which the following is a specification.

This invention relates to seed dropping mechanisms and is particularly designed to provide an improved device for controlling the discharge of corn seed from a hopper of the corn planter.

One of the objects of the invention is the production of a device whereby the rotary motion of a ground contacting wheel, suitably supported on a corn planter frame, may be effectively utilized to operate the seed delivering mechanism of the planter.

Another object of the invention is the production of a device capable of being easily mounted on a corn planter frame adapted to automatically control the delivery of seed corn by means having connection with ground contacting wheels carried by the planter.

A still further object of the invention is the construction of means capable of being readily mounted on a corn planter frame and adapted to adjust itself to the various irregularities of the ground over which the planter is caused to travel, and which will effectively operate a pair of seed delivering slides and mark the ground at the points where the seed is released from the hoppers.

With the above and other objects in view this invention consists in certain constructions, combinations and arrangements of parts, clearly illustrated in the accompanying drawings and described in the following specification.

In the accompanying drawings, Figure 1 is a plan view showing my improved dropper mechanism mounted for operation on a corn planter frame, Fig. 2 is a detail perspective view of the dropper mechanism, Fig. 3 is a detail side elevation of an operating wheel, Fig. 4 is a fragmentary sectional view of a portion of the dropper mechanism, and Fig. 5 is a detail view showing the connections with the seed releasing mechanism.

Referring to the accompanying drawings which are prepared for illustrative purposes and are accordingly not drawn to scale, numerals 1 and 2 denote traction wheels which are journaled on the outer ends of a shaft or axle 3, upon which is suitably fixed a corn planter frame 4. The planter frame 4 is provided with a platform consisting of transversely extending beams K, having a forwardly extending draft bar or tongue 5, and seed delivering mechanisms in hoppers 6, which are preferably located on the outer ends of the beams K.

Intermediate of the ends of the beams K, upstanding brackets G are secured thereon, while on the outer ends of the beams K, a pair of upstanding bearing brackets G', formed with elongated shaft openings G² are secured. On the upper ends of the brackets G a middle shaft section D is rotatably mounted and to the opposite ends of said shaft section outer shaft sections C and E are connected by means of universal joints F. On the outer ends of the outer shaft sections C and E, which extend through the elongated openings G² of the bearing brackets G', a pair of ground contacting wheels A are suitably fixed, each of the wheels A being provided with three marker arms B secured at equi-distant points to the periphery or rim thereof.

A wheel H having a widened rim formed or provided with three inwardly projecting fingers or studs H', arranged at equi-distant points thereon, is fixed to the middle shaft section D. Adjacent to the lower portion of the wheel H, an upstanding bearing bracket L is fixed on the beams K, and serves as a support for a shaft J having a sleeve formed with a peripheral tooth or stud I and a sleeve M formed with a depending crank arm M'. A link N is pivotally connected with the arm M' and with a transversely extending operating bar O having suitable connections with the seed releasing mechanisms or hoppers of the corn planter. In order to hold the operating bar O in its normal position and to hold the discharge openings of the hoppers normally closed a tension spring P is connected to the operating bar and to the draft tongue or bar 5.

In Fig. 5 is shown the manner in which the operating bars are connected to the seed releasing mechanism. The connecting ends of the bars are provided with lugs 8, which extend through slots 9, in the bottom of the seed hoppers, and connect with seed releasing plates 10, of the conventional kind. Any kind of suitable connection may be employed in adapting my device to a planter.

When the planter is driven over the ground the wheels A will be caused to revolve so that motion will be transmitted to the shaft-sections C and E to the middle shaft section D and to the operating wheel H. As the wheel H revolves with the shaft section D, the studs H' will be successively brought into engagement with the stud I and the arm M' will be rocked on the bracket L, thereby actuating the link N and the operating bar O so that the seed mechanism of the hoppers 6 will be simultaneously actuated and seed will be released therefrom. After one of the studs H' of the wheel H passes the stud I the operating bar O is instantly brought to its normal position by the tension of the spring P, and the seed discharge openings of the hoppers are closed. The marker arms B of the wheels A are fixed thereon so that they will be in line with the studs or fingers H' of the operating wheel H; whereby the position of the discharged seeds on the ground will be accurately indicated by ground marks made by the marker arms. This arrangement enables an operator to drive the planter over the field and to plant the seed corn in parallel rows without any difficulty. By means of the sectional shaft arrangement and the ground contacting wheels supported thereon provision is made for a vertical movement of the ground contacting wheels so that the irregularities of the ground will have no effect on the continuity of the operation of the seed releasing mechanism.

I claim and desire to secure by Letters Patent:—

1. In a dropper mechanism, the combination with a planter having seed releasing mechanism thereon, a shaft section supported on the planter frame, outer shaft sections having universal joint connection with the first shaft section, means for supporting the outer shaft sections whereby a vertical movement of the same is permitted, a wheel mounted on the first shaft section having inwardly projecting peripheral teeth, a rocker arm pivoted on the frame for engagement with the peripheral teeth, and means for connecting the rocker arm to the seed releasing mechanism.

2. In a dropper mechanism, the combination with a corn planter having seed releasing mechanisms thereon, a shaft section supported on the planter frame, outer shaft sections supported on the planter frame, universal joints for connecting the outer shaft sections to the first shaft section, ground contacting wheels having marker arms thereon connected to the outer shaft sections, an operating wheel having inwardly projecting studs formed on its rim secured on the first shaft section, a bearing bracket located on the planter frame adjacent to the operating wheel, a rocker arm adapted to be engaged and actuated by the studs of the operating wheel supported on the bracket, a link pivotally connected to the rocker arm, a transversely extending operating bar connected with the link and having connection with the seed releasing mechanisms, and a tension spring connected to the operating bar for holding the same in its normal position.

JOHN BRUSTER ERWAY.

Witnesses:
HENRY NEWTON FRAZIER,
LUCY ROXANA ALLEN.